May 11, 1937.   A. WEISS   2,079,978
MEANS FOR CONTROLLING THE BRAKES OF MOTOR VEHICLES
Filed Jan. 30, 1935   2 Sheets-Sheet 1
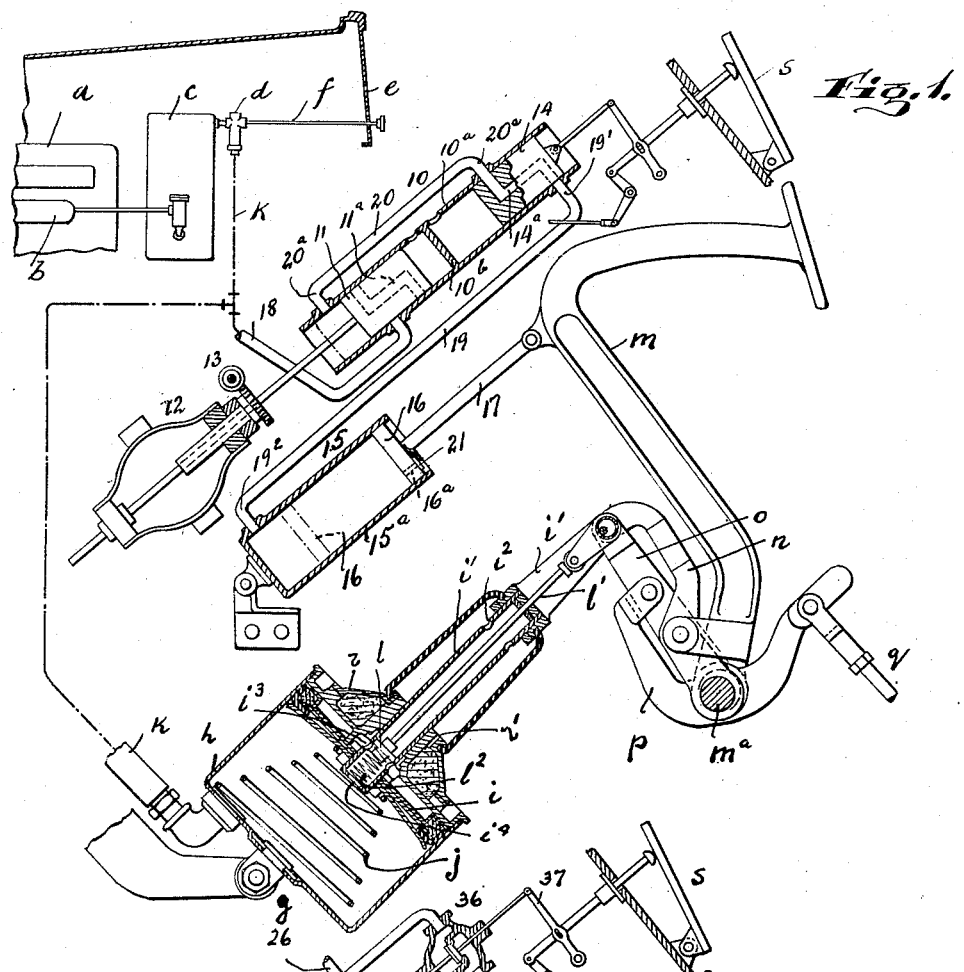
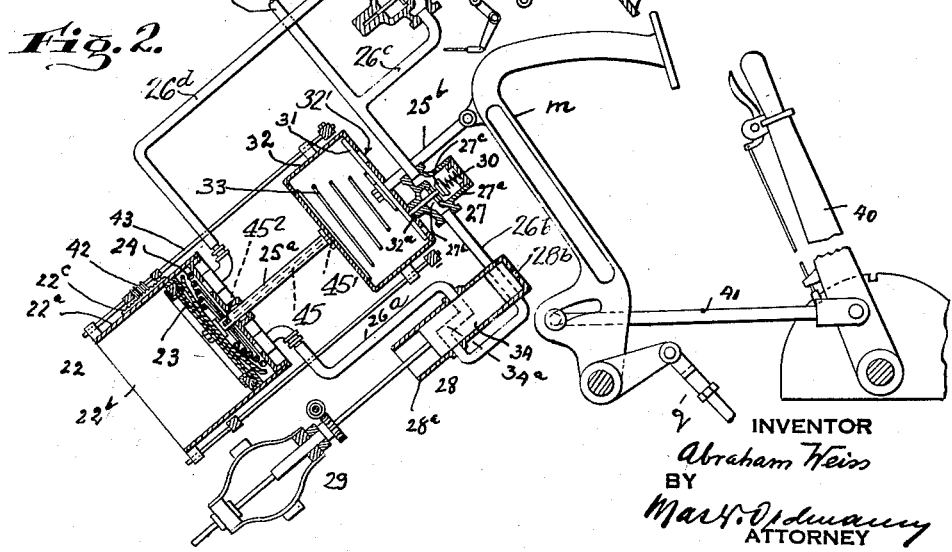
INVENTOR
Abraham Weiss
BY
ATTORNEY May 11, 1937.  A. WEISS  2,079,978
MEANS FOR CONTROLLING THE BRAKES OF MOTOR VEHICLES
Filed Jan. 30, 1935  2 Sheets-Sheet 2
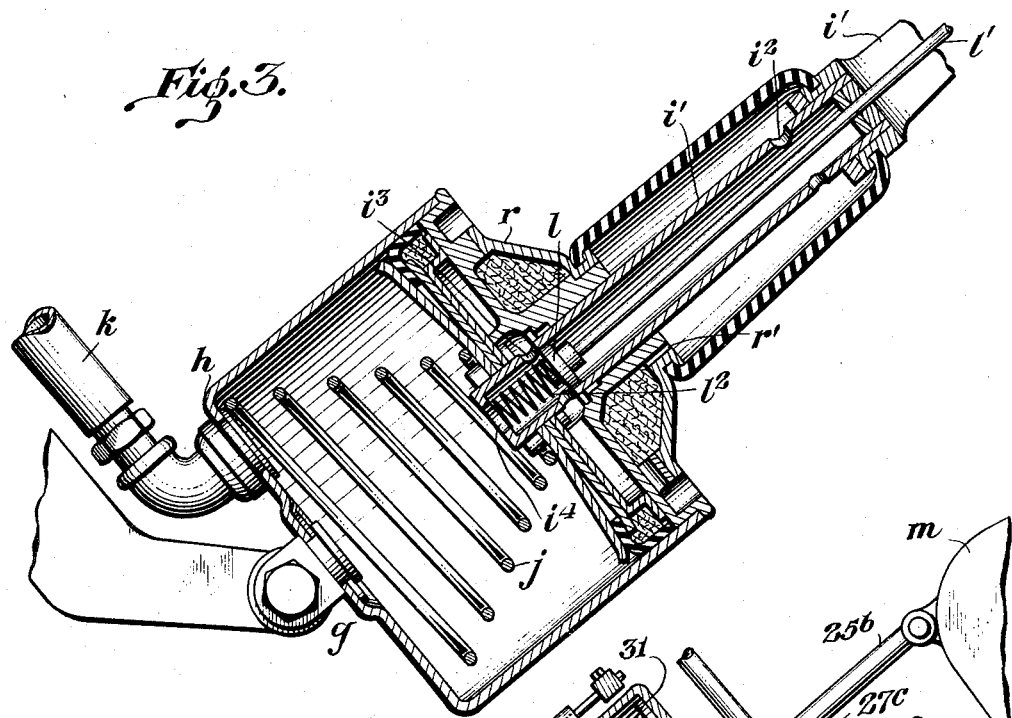
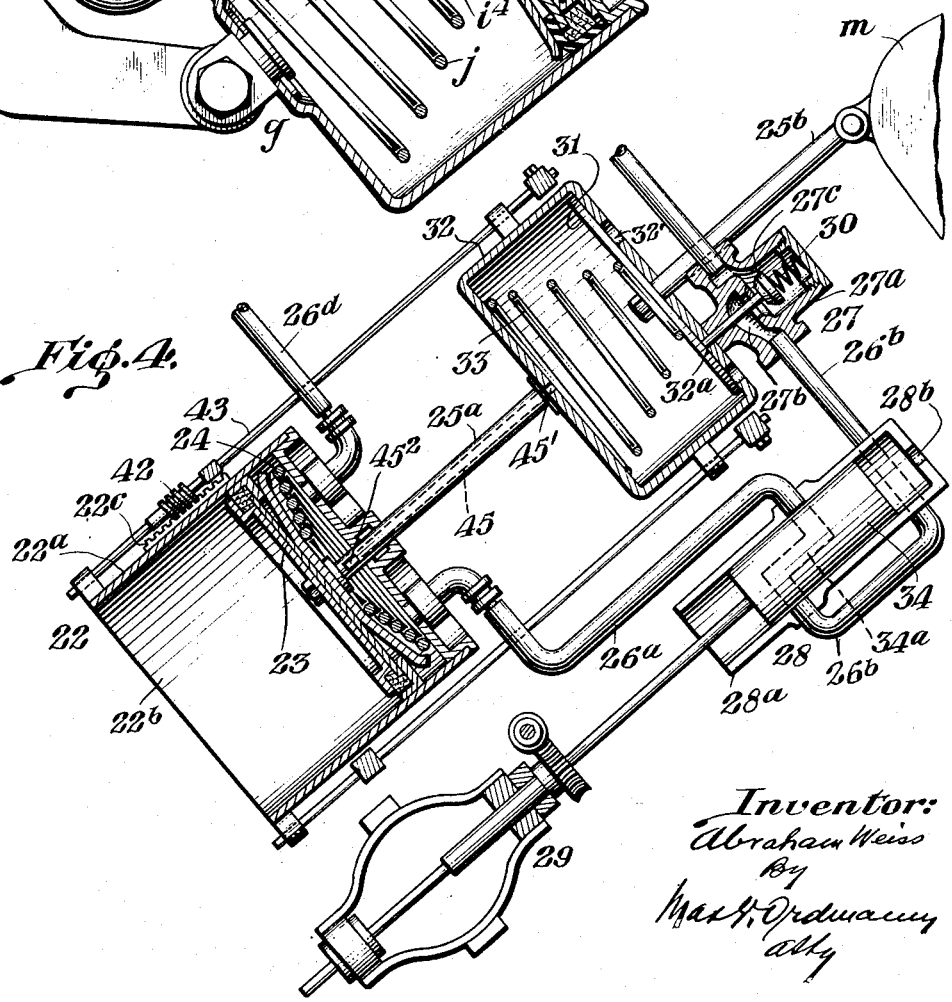
Inventor:
Abraham Weiss
By
Max H. Ordmann
Atty Patented May 11, 1937

2,079,978

UNITED STATES PATENT OFFICE 2,079,978

MEANS FOR CONTROLLING THE BRAKES OF MOTOR VEHICLES

Abraham Weiss, New York, N. Y., assignor to Joe Weiss, New York, N. Y.

Application January 30, 1935, Serial No. 3,998

12 Claims. (Cl. 192—3)

The present invention relates to motor vehicles and specifically to means for controlling the automatically operated brakes thereof.

With the hitherto used brakes of this type, particularly vacuum controlled brakes, there is the drawback that as soon as the foot is taken off the brake pedal the brakes become released so that when the vehicle happens to stop on a slope it will have the tendency to roll forward or backward as the case may be unless the user has not failed to apply the emergency brake.

Another drawback with the old vacuum controlled brakes is that when suction is interrupted for some reason, the brakes cease to operate automatically, but have to be operated by foot pressure against the tension of a spring.

My invention has for its object to obviate these drawbacks and consists in the novel construction, combination and arrangement of parts as will hereinafter be more fully described and set forth in the appended claims.

In the accompanying drawings which form part of the specification and in which similar reference characters denote corresponding parts, Fig. 1 is a diagrammatic view of a well known type of vacuum brake construction equipped with auxiliary control means constituting part of my invention;

Fig. 2 is a sectional view of a modified form of brake control means;

Figs. 3 and 4 are enlarged sectional views of the power units shown in Figs. 1 and 2, respectively.

The auxiliary means shown in Fig. 1 are adapted to be used in connection with the power unit of the known vacuum control system and have the object to lock the brake in applied position and retain it in that position until the vehicle is to be started by the depression of the accelerator.

In Fig. 1, $a$ denotes the motor, $b$ the intake manifold, $c$ an auxiliary vacuum tank, $d$ a check valve for said tank controlled from the dashboard $e$ through the push rod $f$. $g$ denotes the power unit of the well known type of vacuum brake control system which consists of the following construction:

The unit comprises a stationary cylinder $h$ in which works a piston $i$ actuated by a spring $j$. Leading from the check valve $d$ into said cylinder in front of the piston is a suction pipe $k$. The piston rod $i'$ is hollow and working therein is a spring actuated valve $l$ which in inoperative position of the brake opens communication between the chambers in front and back of the piston so that there is vacuum on both sides of the piston and the latter under the action of spring $j$ is retained in its upward or rearward position. The brake pedal $m$ fulcrumed at $m^a$ on the chassis is connected by a lever $n$ to the piston rod $i'$. Pivoted on the same fulcrum $m^a$ is a lever $o$ whose other end is pivoted with play to the rod $l'$ of the valve $l$. Mounted on the same fulcrum $m^a$ and connected to the lever $o$ is one arm of a bell crank $p$, the other arm of which through the usual connections $q$ operates the brakes (not shown). The piston rod $i'$ is provided with air passages $i^2$ and $i^3$. The passages $i^3$ terminate into the space behind the piston $i$ and are controlled from the valve $l$ so that when the brakes are off and the valve $l$, by its spring $l^2$, is held in retracted position (as shown in Fig. 1), there is free communication between the chambers in front and rear of the piston $i$ through the open end $i^4$ of piston rod $i$. On the initial depression of the foot brake the valve $l$ is moved forwardly closing communication between said chambers and opening the passages $i^3$ to the passages $i^2$ for the atmosphere which enters the chamber behind the piston through a filter $r$ and passage $r'$ so that the piston will be moved downwardly or forwardly under the atmospheric pressure acting against the rear of said piston against the tension of the spring $j$.

Thus far, the power unit, as stated before, operates in well known manner and it is apparent that upon release of the brake pedal $m$ the valve $l$ by its spring $l^2$ will be pushed into retracted position establishing communication between the chambers in front and back of the piston $i$ restoring vacuum equilibrium in said chambers, whereupon said piston $i$ under the action of its spring $j$, will move into inoperative position, in consequence of which the brakes will be released.

If the vehicle happens to have stopped on an incline and the user failed to apply the emergency brake or the latter be released by some unauthorized person, the vehicle will roll. It is also clear that should, for some reason, suction cease, the automatic operation of the vacuum controlled brake will also cease.

To obviate these drawbacks I provide the auxiliary safety means of which the following is one embodiment thereof:

10 is a double valve mechanism consisting of a stationary elongated cylinder $10a$ partitioned about centrally as at $10b$. In one compartment of said cylinder works a piston $11$ actuated from a suitable centrifugal governor or the like $12$ which is driven through suitable gears $13$ from the propeller-shaft (not shown) or any part operatively connected therewith so as to be driven from the vehicle. Working in the other compartment of said cylinder 10a is a piston 14 which by suitable means is adapted to be actuated from the accelerator pedal s. In addition to this double valve I provide a valve 15 consisting of a stationary cylinder 15a in which works a piston 16. This piston through its rod 17 is connected to the brake pedal m. Each of the two pistons 11 and 14 of said double valve mechanism is provided with a transversely extending passage 11a, 14a respectively, whose ends are open at both sides of the piston. Leading from the check valve d or branching off from the suction pipe k is a suction pipe 18 which terminates into one side of the cylinder 10a and whose open end is controlled by the governor actuated piston 11. Terminating into the same side of the cylinder is one end 19' of a suction pipe 19 controlled through the piston 14. The other end, 19², of said suction pipe 19 terminates into the valve cylinder 15a and is controlled through piston 16.

Provided on the other side of the cylinder 10a is a suction pipe 20 whose ends 20a, 20b terminate into the cylinder and are controlled by the two pistons 11 and 14 respectively. The pistons 11, 14 are so arranged in the compartments of the cylinder 10a, that the passage 11a of piston 11 is displaced relative the suction pipes 18 and 20 when the governor is in motion and the passage 14a of the piston 14 is displaced relative the pipes 19 and 20 when the accelerator pedal is depressed, and vice versa.

The piston 16 is provided with a passage 16a controlled by a spring actuated flap 21 which leads into the atmosphere, said flap 21 being adapted to close the passage 16a when there is suction in front of the piston and to open under the action of the atmospheric pressure entering the cylinder 16 through pipe 19, and cylinder 10a when the valve 14 is displaced therein.

The operation is as follows:

When the vehicle is in motion, while the accelerator pedal s is depressed, atmospheric pressure through the pipe 19 from the cylinder 10a acts against the rear of piston 16 and the atmospheric pressure in front of said piston leaves the brakes unaffected. On the depression of the brake pedal m and the release of the accelerator pedal s, while the car, by its momentum, is still moving, there will be no suction in the valve 15 until the vehicle comes to a full stop. Therefore, the operation of the brakes through the power unit g will be unaffected by my auxiliary device. But the instant the vehicle stops the governor will move the piston 11 into the position in which communication will be established between said valve 15 and the auxiliary vacuum tank c or intake manifold b through the pipe 19, valve 14, pipe 20, valve 11 and pipe k. The flap 21 will then close under the tension of its spring and the piston 16 will move forwardly under the atmospheric pressure behind it and lock the brake pedal in the depressed position in which the brakes are operative. Hence, provided there is sufficient vacuum in the auxiliary vacuum tank or the motor is not stalled, the brakes will be locked.

The unlocking of the brakes can be effected only on the depression of the accelerator pedal s when starting the vehicle. For, as soon as the accelerator pedal s is depressed the piston 14 actuated thereby will be displaced in the cylinder 10a so as to cut off communication between said valve and the suction exerting source. In consequence thereof the foot released brake pedal will now, through the action of its spring j, return into inoperative position.

This construction, however, which is adapted to be used in connection with the known vacuum controlled brake system, has the disadvantage that the brakes will be automatically released as soon as the vacuum in the auxiliary tank c has been exhausted and the motor is stalled. This disadvantage is entirely removed by the construction shown in the modification of Fig. 2. Here the power unit 22 comprises a cylinder 22a which is open to the atmosphere at one end 22b and in which works a piston 23 of similar construction to that of piston i in the first modification. Against the rear of said piston 23 acts a relatively strong spring 24. Said piston is connected through a sectional rod 25a, 25b to the brake pedal m in the manner hereinafter described. Suitable means may be used for controlling an air passage leading into the rear end of the cylinder and serving to relieve the vacuum therein, when suction ceases and the piston 23 is to move forwardly.

Leading from the check valve d is a pipe 26 controlled by two valves 27 and 28. The valve 27 is adapted to be controlled from the brake pedal, so that when the latter is released, said valve 27 is open, and vice versa. The valve 28 is adapted to be actuated from a revolving part of the vehicle, as centrifugal governor 29, in such a manner that as long as the vehicle is in motion, said valve will be open. The valves 27 and 28 can be of any suitable construction. In the example shown valve 27 is shown in form of a two-way cock arranged in proximity of section 25b of the piston rod and comprises a valve casing 27a having a valve seat 27b and a valve body 27c which by a relatively weak spring 30 normally tends to bear on its seat 27b. Section 25b of the piston rod at one end is connected to the brake pedal m and its other end to a movable member 31 provided in a casing or frame 32 fixed to the rear end of section 25a of the piston rod. This member 31 is actuated by a spring 33 which tends to hold said member close to the rear end of said casing or frame 32. The stem of the valve body 27c is adapted to project through an orifice 32a into the casing so as to be in the path of said member or plunger 31 whose spring 33 is stronger than spring 30, so that when said member 31 under the action of its spring 33 is in its initial or inoperative position, it will lift the valve body 27c from its seat 27b and thus retain the valve 27 in open position. At the initial movement of the brake pedal m the rod section 25b will depress the member 31 against its spring tension, permitting the valve body 27c to return onto its seat 27b by its own spring force to close the valve.

In the example shown the means for controlling an air passage in the rear of the cylinder 22b consist of a passage 45 extending through the rod 25a and which at its one end as at 45¹ opens into the casing 32 and at its other end as at 45² opens into the rear of the cylinder 22b. When the plunger 31 is moved away from the rear wall of the casing 32 by the depression of the brake pedal m air entering the casing through the openings 32¹ thereof will pass through passage 45 into the rear of the cylinder 22b.

The second auxiliary valve 28 may be similar to valve 11. It comprises a cylinder 28a in which works a plunger 34 having a transversely extending passage 34a whose open ends communicate on one side with the branch 26a of the pipe 26 leading into the rear or suction chamber of the cylinder 22a, and with the other with the branch 26b leading from valve 27. The plunger 34 is actuated from the centrifugal governor 29 or any revolving part controlled by the speed of the vehicle, so that while the vehicle is in motion the plunger 34 is in such position that the ends of its passage 34a register with the terminals of the pipe leading into and out of the cylinder 28a of valve 28 so that said valve is open. The small opening 28b serves merely as an air vent and is not adapted to communicate with any of the pipes 26a, 26b when the plunger 34 is displaced from the position shown. Branching off from pipe 26 is a branch 26c which leads into one side of a valve 36 and a branch 26d from the other side of said valve 36 leads into the rear or suction chamber of the cylinder 22a. This valve 36 may be similar in construction to that of valve 27, or of any other suitable construction and is adapted to be actuated from the accelerator pedal *s* through lever 37 or other suitable means, so that when the accelerator pedal is not depressed the valve 36 is closed and vice versa.

The operation is as follows:

While the vehicle is driven or the accelerator pedal *s* depressed, the valve 36 is open so that there is suction through pipe 26d at the rear of the piston 23 of the power unit 22 in consequence of which said piston is held in its rearward or inoperative position by the atmospheric pressure exerted thereon in front of said piston, compressing the spring 24. At the instant the accelerator pedal *s* is released valve 36 will close, and on the initial depression of the brake pedal *m* member 31 will permit valve 27 to close, so that suction at the rear of the piston 23 is interrupted. As a result thereof the spring 24 will force the piston 23 forwardly to apply the brakes through the means *g*.

If the vehicle is coasting, that is, the governor 29 still moving, a short release of the brake pedal will immediately reestablish vacuum at the rear of piston 23 through the valves 27 and 28 causing the piston 23 to move rearwardly to release the brakes. But, as soon as the vehicle comes to a full stop while the foot is on the brake pedal, suction at the rear of the piston ceases and the piston 23 by its spring 24 is moved into and locked in forward position, locking the brakes in applied position. It is only after the depression of the accelerator pedal *s* opening valve 36 that suction in the rear chamber of the cylinder 22a will be reestablished causing an automatic release of the brakes.

Should the vacuum tank be exhausted and the motor stall, so that there is no suction at the rear of the piston, the piston 23 will remain locked in its forward position by the action of spring 24 retaining the brakes in applied position. To enable the release of the same under such circumstances I may use a manually operated emergency lever 40 similar to an emergency brake operating lever operatively connected to the brake pedal by rod 41 or other suitable means whereby the piston 23 may be brought back into its inoperative position.

The tension of the spring 24 may be made adjustable by any suitable means. In the present embodiment the cylinder 22a is provided with a rack 22c with which gears a worm 42 provided on a spindle 43. By displacing the cylinder relative to the piston 23 the tension of the spring 24 will be adjusted.

It is understood that the construction shown may be modified in various ways without departing from the principle of my invention and I, therefore, do not wish to restrict myself to the details shown and described.

What I claim is:

1. In a vehicle having brakes, brake control means, means for setting the vehicle in motion including an accelerator, a power unit adapted to automatically operate the brakes on the operation of said brake control means, and auxiliary control means for said power unit including means actuated by a driven part of the vehicle and means actuated by said accelerator, both said means being adapted to control the power of said power unit, so that when said brake control means is released the brakes will be locked in operative position until said second named means are operated.

2. In a motor vehicle having brakes and suction exerting means, brake control means including the brake pedal, an accelerator pedal, a power unit connected to said suction means and adapted to automatically operate the brakes on the depression of said brake pedal, and auxiliary control means for said power unit including a valve adapted to be actuated from the driven part of the vehicle and a valve adapted to be actuated from the accelerator pedal so that when the brake pedal is released the brakes will be locked in operative position until said accelerator pedal is depressed.

3. In a motor vehicle, brake control means as per claim 2 in which the power unit comprises a cylinder, a piston operatively connected to said brake pedal and a spring actuating said piston to apply the brakes when suction in said power unit is cut off from said suction exerting means.

4. In a motor vehicle, brake control means as per claim 2 in which the power unit comprises a cylinder communicating with the atmosphere at one end and with said suction means at the opposite end, a piston movable in said cylinder and operatively connected to said brake pedal and a spring in said suction end of said cylinder for actuating said piston to apply the brakes when suction in said cylinder has been cut off from said suction exerting means.

5. In a motor vehicle, brake control means as per claim 2 in which the power unit includes a cylinder, a pipe connection leading into said cylinder from said suction exerting means, a spring actuated piston movably borne in said cylinder and operatively connected to said brake pedal and a valve controlling said pipe connection and actuated from said piston to close when said brake pedal is depressed.

6. In a motor vehicle, brake control means as per claim 2 in which said power unit comprises a spring which when suction ceases will automatically apply the brakes and retain them in operative position.

7. In a motor vehicle, brake control means as per claim 2 in which the power unit includes a connection with said suction exerting means, a valve controlling said connection, a piston operatively connected to the brake pedal and means associated with said piston to actuate said valve, so that when said piston is in initial or inoperative position said valve will be held open by said last named means and when moved into operative position its said means will permit said valve to close.

8. In a motor vehicle, brake control means as per claim 2, in which the brake pedal is connected to a manually operated emergency means for releasing the brakes.

9. In a motor vehicle, brake control means as per claim 2 in which the power unit comprises a cylinder open at one end to the atmosphere and communicating with said suction means at the opposite end, a piston movable in said cylinder and operatively connected to said brake pedal, a spring in the suction end of said cylinder to actuate said piston for applying the brakes, and means for adjusting the tension of said spring.

10. In a motor vehicle, brake control means as per claim 2, in which said power unit includes a valve actuated from said accelerator pedal and which directly controls the connection between said power unit and said suction exerting means.

11. In a vehicle having brakes, brake operating means, means for setting the vehicle in motion including an accelerator, a power unit adapted to be automatically controlled by the brake operating means, control means for said power unit including means actuated by a driven part of the vehicle and means actuated by said accelerator, both said last named means being adapted to control the power of said power unit so that when said brake operating means are released the brakes will be locked in operative position until said accelerator is operated.

12. In a vehicle having brakes, suction exerting means, brake operating means, means for setting the vehicle in motion including an accelerator, a power unit connected to said suction means and adapted to be automatically controlled by said brake operating means, control means for said power unit including means actuated by a driven part of the vehicle and means actuated by said accelerator, both said last named means being adapted to control the power of said power unit so that when said brake operating means are released the brakes will be locked in operative position until said accelerator is operated.

ABRAHAM WEISS.